United States Patent Office 3,367,759
Patented Feb. 6, 1968

3,367,759
ALKALI METAL DERIVATIVES OF ALKANOLS IN GASOLINE FUELS
Enver Mehmedbasich, El Cerrito, and Maurice R. Barusch, Richmond, Calif., assignors to Chevron Research Company, San Francisco, Calif., a corporation of Delaware
No Drawing. Filed Sept. 30, 1965, Ser. No. 491,865
2 Claims. (Cl. 44—78)

ABSTRACT OF THE DISCLOSURE

Alkali metal oxides of hydroxy ethers and hydrocarbon solutions thereof.

---

This invention relates to novel alkali metal derivatives of alkanols and to useful hydrocarbon compositions containing them. More particularly, the invention is concerned with a new class of alkali metal oxides of certain alcohols and phenols having improved solubility in hydrocarbons.

Alkali metal oxides, i.e. alkoxides and phenoxides, are generally infusible compounds having very low solubilities in hydrocarbons. They are strongly basic and thus useful in chemical reactions requiring a strong base having an organic radical as part of the molecule. The low solubilities of these compounds in hydrocarbons limit their utility in reactions carried out in hydrocarbon solvents since the insoluble powdered alkali alkoxide or phenoxide reacts very slowly.

It has been found that a new class of alkali metal derivatives of alcohols and phenols is provided in the alkali metal oxides of hydroxy ethers selected from the group consisting of monohydrocarbyl ethers of 1,2-glycols, 1,3-glycols, 1,2-dihydroxybenzenes and o-hydroxybenzyl alcohols, said glycols, hydroxybenzenes, alcohols and hydrocarbyl groups each containing from 2 to 10 carbon atoms.

The metal derivatives of the ether-hydroxy organic compounds of the invention can be prepared by reacting an alkali metal or a hydride of an alkali metal with the ether-alcohol or ether-phenol. This is usually carried out by contacting the metal or hydride with the ether-alcohol or phenol in a hydrocarbon solvent to prepare a solution of the alkali metal derivative or "ether alcoholate" as it may be formed. The alkali metals include lithium, sodium, potassium, rubidium and cesium, with the first three preferred for availability and effectiveness.

As stated earlier, the organic hydroxy compounds yielding alkali metal oxides (or "salts," considering alcohol as a weak acid) soluble in hydrocarbons must be monohydrocarbyl ethers of dihydroxy compounds having the hydroxy groups in the 1,2- or 1,3-positions. The nature of the hydrocarbyl radical forming the ether with one of the hydroxyl groups is not too critical, and it may be acyclic, alicyclic or aromatic in nature. Examples of ethers of 1,2-glycols which are effective are the octyl, phenyl and cyclohexyl monoethers of the ethylene glycol, isobutylene glycol, 1,2-hexylene glycol or phenylethylene glycol. Examples of ethers of 1,3-glycols are the monoethyl ether of 1,3-propanediol and the 3-ethyl ether of 1,3-butanediol. The n-amyl ether of pyrocatechol is an example of a monoether of 1,2-dihydroxybenzene. An example of a monoether of o-hydroxybenzyl alcohol is 2-methoxybenzyl alcohol.

For present purposes the glycol or hydroxy aryl portion of the monoethers of the present invention is preferably an alkylene glycol of 2 to 4 carbon atoms as in the case of ethylene glycol, etc., or a dihydroxy aryl hydrocarbon of 6 to 10 carbon atoms as in the case of 1,2-dihydroxy benzene, o-hydroxybenzyl etc.

The monoethers of the foregoing type are characterized by the general formula

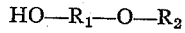

$$HO\text{---}R_1\text{---}O\text{---}R_2$$

in which $R_1$ is 1,2-alkylene or 1,3-alkylene of 2 to 4 carbon atoms, cycloalkylene, arylene or arylalkylene of 6 to 10 carbon atoms and $R_2$ is alkyl of 2 to 4 carbon atoms or cycloalkyl, aryl or arylalkyl of 6 to 10 carbon atoms.

The nature of the hydrocarbon used as a solvent is not critical and may be paraffin, naphthene, olefin, aromatic or mixtures of these. It may be quite volatile such as pentane, or high boiling such as a lubricating oil fraction. Mixtures of hydrocarbons such as gasoline fractions are often preferred. For many purposes, it is desirable to prepare a concentrated solution of the metaloxy-compound in a hydrocarbon such as pentane and to use this concentrated solution as an additive in other hydrocarbon systems.

The alkali metal ether alcoholates of the invention are soluble in hydrocarbon over a considerable range of proportions. Generally, amounts of from about 0.1 to about 10% by weight are suitable from the standpoint of stable solutions. Concentrates, however, may contain as high as about 20% because of the unusual degree of solubility of the alkali metal ether alcoholates.

The metaloxy-compounds of the invention are useful antiknock agents in gasoline. They are also useful as hydrocarbon-soluble bases for catalysts and for preparing alkali metal salts in hydrocarbon systems. These salts thus prepared or the metaloxy-bases themselves are useful lubricating oil additives, especially for use in engines employing high sulfur fuels which give rise to sulfuric acid during combustion.

The following examples are offered as further illustration of the alkali metal derivatives of alkanols and their preparation in accordance with the present invention. Unless otherwise specified the proportions are on a weight basis.

*Example 1.—Lithium "salt" of methoxyethanol*

A solution of 7.1 g. (0.093 mole) of methoxyethanol in 250 g. of pentane was prepared. To this was added 0.64 g. (0.093 mole) of lithium, and the mixture was stirred overnight after which time the metal was dissolved. This solution of the lithium "salt" of methoxyethanol had a concentration of 1.9 g./100 ml. of pentane.

*Example 2.—Sodium "salt" of methoxyethanol*

The procedure of the previous example was followed using 22.6 g. (0.3 mole) of methoxyethanol and an excess of sodium hydride in 350 ml. of dry pentane. When the reaction was complete, the solution was filtered to yield the sodium salt. The concentration was 8.3 g./100 ml. of pentane.

Example 3.—Potassium "salt" of methoxyethanol

Using the same procedure as in the previous examples, 4.2 g. (0.108 mole) of potassium metal was reacted with 8.2 g. (0.108 mole) of methoxyethanol in 250 g. of pentane. The potassium dissolved completely to yield a solution containing 3.1 g. of the "salt"/100 ml. of pentane.

Example 4.—Sodium "salt" of 1-methoxy-2-methyl-2-propanol

To a solution of 18 g. (0.17 mole) of 1-methoxy-2-methyl-2-propanol in 350 ml. of dry pentane was added excess sodium hydride. After the evolution of hydrogen had stopped, the pentane solution was filtered yielding a clear light yellow solution. This solution contained 6.2 g. of "salt"/100 ml. of pentane.

Example 5.—Sodium "salt" of t-butoxy-2-methyl-2-propanol

To a solution of 10 g. of t-butoxy-2-methyl-2-propanol in 350 ml. of dry pentane was added an excess of sodium hydride. After completion of the reaction, the excess hydride was removed by filtration yielding a clear solution of the "salt" which had a concentration of 3.3 g./100 ml. of pentane.

Example 6.—Preparation of 1,3-dimethoxy-2-propanol

This compound was prepared in order to form its lithium "salt." In a 1 l., 3-necked flask equipped with a stirrer, condenser, and addition funnel was added 90 g. of sodium hydroxide in 1500 g. of methanol. To this mixture was added 130 g. of 1,3-dichloroisopropanol and 100 g. of dry methanol. The solution was stirred for 1 hour while refluxing. The sodium chloride formed in the reaction was removed by filtration and the solution was distilled to yield 40 g. of product boiling at 84° C. under a pressure of 34 mm. of Hg.

Example 7.—Lithium "salts" of 1,3-dimethoxy-2-propanol

To a solution of 6.0 g. (0.05 mole) of 1,3-dimethoxy-2-propanol in 300 g. of pentane was added 500 mg. (0.063 mole) of lithium hydride. The mixture was stirred overnight, and the solution was filtered. This yielded a pentane solution containing 1.3 g. of "salt"/100 ml. This same experiment was repeated using benzene in place of pentane to yield a benzene solution containing 1.8 g./100 ml. of solvent.

Example 8.—Sodium "salt" of 1,3-dimethoxy-2-propanol

To a solution of 6.0 g. (0.05 mole) of 1,3-dimethoxy-2-propanol in 210 g. of pentane was added 2.4 g. (0.05 mole) of sodium hydride (50% pure). The solution was stirred until the reaction was complete and filtered. The clear solution had a concentration of 2.5 g. of "salt"/100 ml. of pentane.

Example 9.—Lithium "salt" of o-methoxyphenol

To a solution of 18.6 g. (0.15 mole) of o-methoxyphenol in 390 g. (420 ml.) of benzene was added 1.04 g. (0.15 mole) of lithium metal. After stirring overnight, the lithium was dissolved yielding a clear solution containing 4.6 g. of "salt"/100 ml. of benzene.

The effectiveness of the alkali metal derivatives of alkanols as antiknock additives in gasoline was evaluated in a series of tests. In the tests the commonly accepted F-1 research method octane numbers and F-2 motor method octane numbers were obtained on various sodium and lithium ether oxides in a variety of base fuels. The test results are set out in the following table:

TABLE.—ANTIKNOCK PROPERTIES OF ALKALI METAL DERIVATIVES

| Compound | Example No. | Base Fuel Description | Additive, Wt. percent | Base Fuel | | Test Fuel | | | |
|---|---|---|---|---|---|---|---|---|---|
| | | | | F-1 | F-2 | F-1 | ΔF-1 | F-2 | ΔF-2 |
| Lithium 2-methoxyethoxide | 1 | 11% n-pentane, 89% isooctane | 0.4 | 94.0 | 94.2 | 95.2 | +1.2 | 96.7 | +2.5 |
| Sodium 2-methoxyethoxide | 2 | 11% n-pentane, 89% isooctane | 0.4 | 94.0 | 94.2 | 98.3 | +4.3 | 98.2 | +4.0 |
| Lithium 2-methoxyphenate | 9 | 11% benzene, 89% isooctane | 0.6 | 100.8 | 98.4 | 103.4 | +2.6 | 99.0 | +0.6 |

The above test results show that the lithium and sodium "salts" impart definite octane number improvements to high octane base fuels.

As illustrated by the foregoing examples, the present invention also relates to improved gasoline fuels containing the alkali metal derivatives of alkanols as antiknock agents. The base fuels are typical hydrocarbons boiling in the gasoline boiling range suitable for use in spark ignition type engines. They are conveniently prepared by the usual refining and blending process and normally contain straight-chain paraffins, branch-chain paraffins, olefins, aromatics and naphthenes. The unleaded base fuel is generally characterized with having an ASTM (D–86) distillation with an initial boiling point of about 90° F. and a final boiling point of about 425° F. Such base fuels have a clear Research octane number of about 85 to about 100 as determined by the accepted CFR engine test method.

The alkali metal derivative of alkanol may be used as the sole antiknock agent in the gasoline or it may be used in combination with organolead antiknock additives such as tetramethyl lead, tetraethyl lead, ethyltrimethyl lead, tetrapropyl lead, tetraphenyl lead, vinyltrimethyl lead etc.

The alkali metal derivative is used in amounts sufficient to improve the octane number. Ordinarily amounts in the range of from 0.1 to 2.0% by weight are suitable for this purpose.

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

We claim:

1. Alkali metal oxides of hydroxy ethers having the formula $$HO-R_1-O-R_2$$

in which $R_1$ is selected from the group consisting of 1,2-alkylene and 1,3-alkylene groups of 2 to 4 carbon atoms, cycloalkylene, arylene and arylalkylene groups of 6 to 10 carbon atoms, and $R_2$ is selected from the group consisting of alkyl of 2 to 4 carbon atoms, cycloalkyl, aryl and arylalkyl groups of 6 to 10 carbon atoms, said alkali metal oxides being soluble in hydrocarbon solvents.

2. Improved gasoline fuels containing the alkali metal oxide of claim 1 in an amount sufficient to improve the octane number.

(References on following page)

References Cited

UNITED STATES PATENTS

| | | | |
|---|---|---|---|
| 2,151,432 | 3/1939 | Lyons et al. | 44—77 |
| 2,184,956 | 12/1939 | Gilliland et al. | 44—77 |
| 2,716,057 | 8/1955 | Whaley | 260—615 |
| 2,796,443 | 6/1957 | Meyer et al. | 260—615 |
| 2,853,530 | 9/1958 | Banigan | 44—77 |

PATRICK P. GARVIN, *Primary Examiner.*

DANIEL E. WYMAN, *Examiner.*

C. F. DEES, *Assistant Examiner.*